E. J. Brown.
Excavator.
No. 92421.　　　　Patented Jul. 13. 1869.
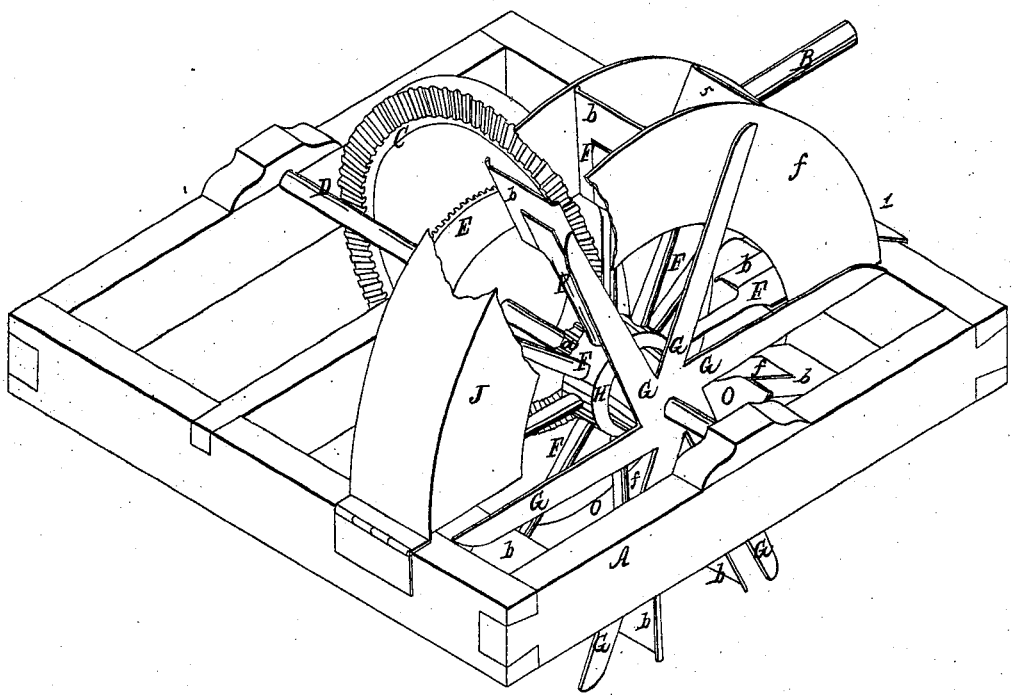
Witnesses.　　　　　　　　　　　　　　　Inventor.

United States Patent Office.

EDWIN J. BROWN, OF CARROLL PARISH, LOUISIANA.

Letters Patent No. 92,421, dated July 13, 1869.

IMPROVED MACHINE FOR MAKING LEVEES.

The Schedule referred to in these Letters Patent and making part of the same.

*To all whom it may concern:*

Be it known that I, EDWIN J. BROWN, of the parish of Carroll, in the State of Louisiana, have invented a certain new and useful Improvement in Machines for Making Levees; and I do hereby declare the following to be a full, clear, and exact description of the same, reference being had to the annexed drawing, making a part of this specification.

My invention, as the title I have given it imports, is chiefly designed for throwing up levees along the Mississippi river and other American water-courses, which, at certain seasons of the year, overflow their banks, with the view to confine the waters of the same within given bounds, and to secure the lands bordering thereupon to the uses of agriculture; but it may be applied usefully to the digging of ditches, the throwing up of embankments for railroad-beds, and other similar or analogous purposes; and It consists of a combination of a revolving cutting-implement with a system of revolving excavating and throwing-up shovels or paddles, the former being provided with six or more radiating knives, and the latter with a sufficient number of peculiarly-formed shovels, secured at the extremities of radiating arms, the function of the knives being to cut the earth into slices, in a vertical direction, and thus to prepare it for being thrown up with ease by the revolving shovels, which follow immediately behind the knives, and deposit it either upon an endless apron, to be carried some distance from the machine, or upon the ground at one side of the machine, in the line of its forward movement, it being a necessary condition that the shovel-wheel shall revolve with far greater rapidity than the knives, although passing over no more ground, and that the machine shall be driven by a steam-engine, or some equivalent motor.

But my invention will be better understood by referring to the drawing, on which it is illustrated by a view drawn in perspective.

On a suitable strong frame, A, which may or may not be of the form shown on the drawing, in proper journals secured thereto, I mount a driving-axle, B, on which is fitted a driving cog-wheel, C, of large size, and a driving-pinion, not shown on the drawing, of small diameter, the former being of cup-form, and so placed as to envelop the latter (which is secured on the end of said axle) by its arched sides, and yet afford room for a connection with a large gear-wheel, for a purpose hereafter to be indicated.

At right angles to shaft B is placed, also in suitable journals, on the same frame A, another shaft, D, which carries on it a cog-gear wheel, E, the same to which I have just referred, the revolving excavating and throwing-up wheel, and the axis from which radiate the knives G.

These knives G are secured to a fixed hub or central circular block, permanently secured, by a feather-key or otherwise, on the said shaft or axle D, by means of suitable radiating sockets or arms, around said hub, and proper clamping-screws or keys, or in such manner as to be removable, so that longer or shorter knives may be used, accordingly as a greater or less penetration and breadth of cut, by them, is desired at any given place or time, at the pleasure of the operator or manager of the machine.

The knives G are made of thin steel plates, kept constantly sharp on the cutting-edge; and, if found necessary, they may be reinforced or strengthened, by being connected together at some intermediate point, between their extremities and the sockets in which they are fitted, by a circular or concentric plate-brace, fastened on or to each knife, by a screw-bolt.

Motion is imparted to this cutter-wheel, if I may so call the radiating assemblage of knives, by means of a cog-gear, E, and a small driving cog-pinion, not shown on the drawings, that is secured, as before stated, on the end of shaft B, near the bottom of the cup-shaped driving-wheel C.

Relatively to the cutter-wheel, about as shown on the drawing, the excavating and throwing-up rotating wheel is fitted loosely on shaft D, in such manner as that said shaft constitutes the axis on which it revolves.

This wheel is rotated by the main driving-wheel C, through the agency of a pinion, $a$, which, being cast in the same piece with the hub H, may be said to be an extension of the same.

The driving-wheel C, being relatively greatly larger than the pinion $a$, gives a very rapid revolution to the excavating-wheel, when moving itself at a slow rate of speed; whereas the gear E, being larger than the unseen driving-pinion, with which it is connected, the rate at which the knives G revolve is necessarily much slower than the revolution of the said excavating-wheel.

The arms F, to which the shovels are secured, like the knives G, are removable, although not so shown by the drawing. They fit into sockets in the hub H, and are fastened therein by any proper means.

The object in having them removable is the same as in the case of the knives, to wit, that a longer may be substituted for a shorter set, or *vice versa*, as the exigency of the occasion may require.

The shovels $b$ are made of steel or iron plate, and substantially of the form as shown; that is to say, their edges are curved on their front faces, as shown.

Over the upper half of the excavating-wheel is placed a hinged metallic casing, something in the manner shown at J.

This casing is so formed and adjusted over the said wheel, that the shovels $b$ will nearly fill up the whole space therein, so that all the earth taken up by them will be carried around their orbit to the point of deposit, which is outside of the frame, at 1, the casing extending over the frame, instead of being closed down upon it, as shown on the drawing, by a flaring expansion of the same.

If found expedient or necessary, a similar casing may be provided beneath the frame A, and extending very near the ground; and in all cases the rear side or wall of this casing must extend underneath the frame A, from one side to the other, as shown at O. This is necessary, to insure the taking up of all the earth, by the shovels b, that is cut down by the knives G.

In making levees, the earth is thrown on an endless apron, of any desired length, and which is connected to the machine by any appropriate frame-work, in such manner as to receive the earth as it is thrown up by the shovels.

I lay no claim to such apron, nor to any of the parts that are necessary to its application and working, and hence I have not deemed it requisite to show it on the drawing.

Any mechanic of ordinary skill will be able to annex it to the machine in a proper manner.

Nor have I considered it necessary to show, on the drawing, the requisite appliances for the locomotion of my invention when not at work, nor the means for operating it beyond the gearing I have described, nor for propelling it over the ground while it is in operation, for it will be readily comprehended, without a drawing, that my machine must necessarily be provided with wheels, that are so connected to it as to allow of its depression or elevation, accordingly as it is at work or not, and that a steam-engine, or other equivalent motor, must also be connected with it, to operate, and, at the same time, carry it forward, which steam-engine or other motor must be sustained by proper frame-work, mounted on wheels.

When a ditch, or an embankment for a railroad, is to be cut or thrown up, it may sometimes happen that no endless apron is necessary, because in neither case is the excavated earth always to be carried a greater distance than it can be precipitated by the machine itself.

To start my machine, it is first requisite to make an excavation by hand, wide and deep enough to receive the excavating-wheel. This done, its operation is as follows:

The engine is put in motion, and moves the machine along in a line just back of the proposed line of the levee to be thrown up, at a rate of speed which will carry each succeeding radiating knife from half an inch to one inch forward of the cut of the one just preceding it.

The cutting of the earth in such thin slices will cause it to fall back within the sweep of the shovels b, which, as it falls, seize upon it, and carry it over to the point 1, where it is precipitated on the apron or on the ground, as the case may be.

The revolution of the excavating-wheel being far more rapid than the knives, no immovable mass of earth can ever accumulate, and hence there can never be any clogging or stoppage of this wheel from this cause.

My machine may be of any size, and, if necessary, can be provided with the means of laying down artificial supports for its wheels, as it goes forward at its work.

Having thus described my invention,

What I claim, and desire to secure by Letters Patent, is—

The combination of a rotating cutter, provided with radiating knives G, with an excavating and throwing-up wheel, provided with radiating arms F, to which are connected shovels b, and covered by a casing, J, when these parts are constructed substantially as herein described, and are operated by the means specified, for the purposes set forth.

E. J. BROWN.

Witnesses:
RUFUS R. RHODES,
WILLIAM MAURY.